United States Patent [19]

Frances

[11] Patent Number: 5,259,852

[45] Date of Patent: Nov. 9, 1993

[54] PROCESS FOR PROTECTING CONTAINERS USED IN NURSERIES AND HORTICULTURE, MACHINE FOR CARRYING IT OUT AND CONTAINER THUS PROTECTED

[76] Inventor: Robert Frances, Route de Nizas, 34120 Pezenas, France

[21] Appl. No.: 713,332

[22] Filed: Jun. 19, 1991

[30] Foreign Application Priority Data

Jun. 21, 1990 [FR] France ................... 90 07919
Oct. 26, 1990 [FR] France ................... 90 13682

[51] Int. Cl.⁵ ............................................. A01G 9/02
[52] U.S. Cl. ............................................ 47/58; 47/66; 47/1.01; 47/84; 111/104
[58] Field of Search ............... 47/901, 1.01 A, 73, 47/84, 58; 111/102, 104, 105

[56] References Cited

U.S. PATENT DOCUMENTS

| | | | |
|---|---|---|---|
| 2,893,168 | 7/1959 | Kobs | 47/59 |
| 3,103,186 | 9/1963 | Saifuka | 111/102 |
| 3,501,896 | 1/1970 | Von Stoeser . | |
| 3,524,279 | 8/1970 | Adams | 47/73 |
| 4,586,288 | 5/1986 | Walton | 47/73 |
| 4,620,390 | 11/1986 | Mehler | 47/901 |
| 5,054,234 | 10/1991 | Cassells | 47/84 |
| 5,068,999 | 12/1991 | Visser | 47/901 |

FOREIGN PATENT DOCUMENTS

| | | |
|---|---|---|
| 2146516 | 9/1960 | France . |
| 2562033 | 7/1963 | France . |
| 2606364 | 6/1964 | France . |
| 2633803 | 8/1964 | France . |
| 136853 | 8/1986 | Japan ................... 47/84 |
| 2241142 | 8/1991 | United Kingdom ........ 47/961 |

*Primary Examiner*—Henry E. Raduazo
*Attorney, Agent, or Firm*—Ladas & Parry

[57] ABSTRACT

A process is disclosed for manufacturing and protecting containers used in nurseries and horticulture, presenting an upper opening obturated by a cover for protecting the substrate previously filled in said container. Each container is subjected at least to an operation for fixing a sheet on its opening, thus closing it, at least an operation of perforating the sheet at its center, at least an operation of cutting the sheet to disconnect it from the web of sheet, and an operation for trimming the excess sheet by cutting it around the pot. These operations are carried out as the pots advance on a machine. The invention also relates to such a machine and to the containers produced.

5 Claims, 2 Drawing Sheets

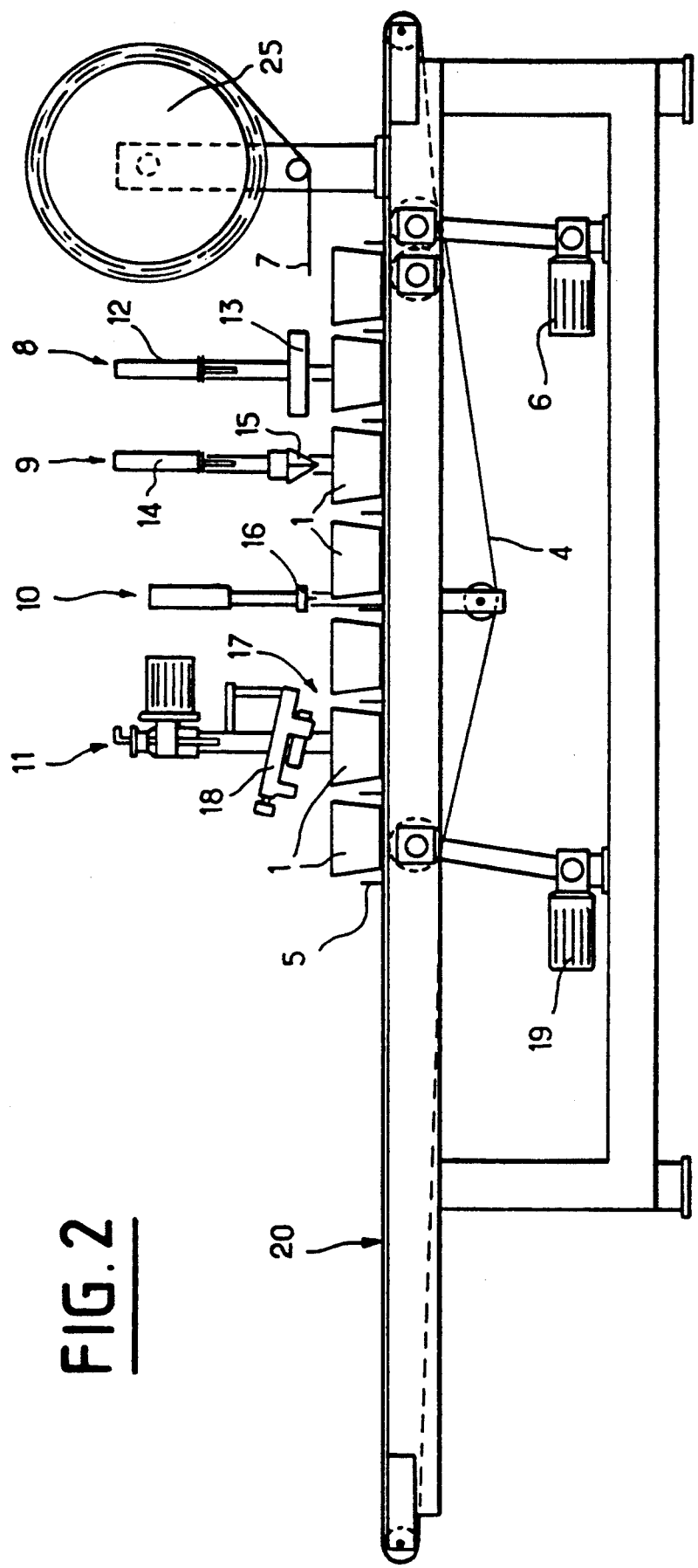
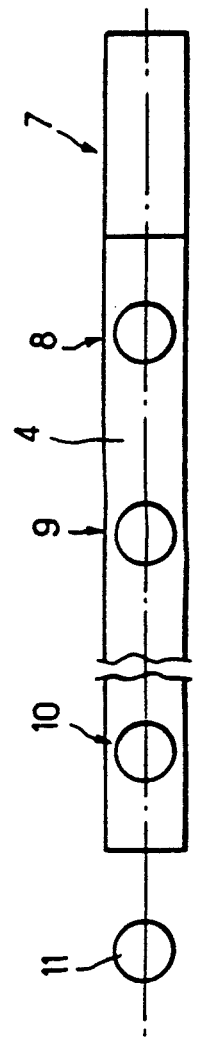
FIG. 2
FIG. 3

5,259,852

PROCESS FOR PROTECTING CONTAINERS USED IN NURSERIES AND HORTICULTURE, MACHINE FOR CARRYING IT OUT AND CONTAINER THUS PROTECTED

FIELD OF THE INVENTION

The present invention relates to a process for protecting a container used in nurseries and in horticulture, to a machine for carrying it out and to a container thus protected.

The technical sector of the invention is the culture of plants in nurseries or out-of-ground horticulture.

One of the principal applications of the invention is the production of containers for the above plants and machines for manufacturing, or rather, for protecting these containers as the envelope or the pot forming them is manufactured and filled with earth or substrate by other machines, in independent operations prior to the operations of the present invention.

BACKGROUND OF THE INVENTION

Said containers used in the above domain are often constituted by pots of cylindro-conical or other shape, generally, but not exclusively, made of synthetic material of the PVC type.

These pots are filled at a high rate by a potting machine which dispenses to each of them a dose of earth or any other substrate. The rate of these machines is of the order of 1000 to 1200 pots per hour. Downstream of this potting machine of any known type, the pots receive the plants and are then directed towards storage areas where they remain during the period of culture and growth.

During this period, the plants must undergo different treatments, such as manual or chemical weeding, fertilizing, watering.

Chemical weeding operations and weeding by hand are expensive.

In order to avoid these operations, it is known that nursery-men and horticulturists place protective covers on the pots or containers, above the earth or substrate which surrounds the roots, and around the stem of the plant or shrub; one example of a cover is described in Patent FR 2 146 516 to Albert LEFEUVRE which specifies that such covers may be constituted by a sheet of deformable material, generally of plastics material which presents a central opening joined to the contour of the cover following the shape of the pot or container by a continuous slot in order to engage the stem therein when these covers are placed in position.

Said covers, on the one hand, prevent the weeds from developing and, on the other hand, oppose too rapid an evaporation of the watering water. Various materials may be used for producing these covers and, at the present time, there are preferably used, jointly or not with a frame, air- and water-permeable sheets of woven or non-woven, knitted or non-knitted textile type, or a microperforated film as described in Patent Application 2 633 803 of Jul. 7, 1988 (to the firm HOLZSTOFF) concerning a composite agro-textile and applications thereof.

The drawback of these cover positioning systems is that man-power is always required, whilst all the operations of filling earth in the containers, of making a hollow at the centre of the potted earth and of planting therein a calibrated or non-calibrated clod containing the roots and from which projects the stem of a plant or shrub, may and are for the major part, and at least for the first two, generally carried out with automatic machines at a high rate, as indicated hereinabove, viz. 1000 to 1200 pots per hour. In fact, no simple enough automatic system has made it possible up to the present time to take into account all the shapes and sizes of stems to place a cover above without risk of injuring them, all the more so as it is desired to follow the same rate as the potting machine located upstream.

The problem raised is therefore that of being able to position a cover on any container, filled with substrate or earth, and adapted to receive a plant, so that at least the operations necessary for potting and protecting the surface of the substrate may be carried out automatically at a high rate and any manual operation is eliminated, or at least the cost thereof reduced, particularly and likewise for the operation of planting; this must be able to be effected whatever the characteristics of said plant or plantation.

Another object of the invention is to ensure satisfactory growth of the plants with reduced watering, which leads to substantial savings but also avoids leaching of the substrate which is detrimental to the action of the fertilizers, the quantity of which may consequently be reduced.

SUMMARY OF THE INVENTION

One solution to the problem raised is a process for protecting containers used in nurseries and horticulture, presenting an upper opening for filling it with earth or any other substrate, in which a hollow is made adapted to receive a plant and protected by the positioning of a cover, in which, before said plantation is placed in position:

a water- and air-permeable sheet is fixed firmly on said opening, closing the latter and ensuring said protection by covering said substrate, said sheet is perforated at the centre of said opening along adjustable dimensions given as a function of said plantation, said plantation may then be planted in the hollow located beneath said sheet and through said perforation, at any moment subsequent to the preceding operations.

In a preferred embodiment, said sheet is dispensed, prior to the fixing operation, from a web which is unwound in a given direction above said container and which is cut after the fixing operation behind said container to disconnect it therefrom.

Moreover, a plurality of said containers are preferably driven one behind the other by any means beneath said web and in the same direction as unwinding thereof to fix said sheet on the containers, perforate it and cut it in the same successive operations for each container as before. All the operations may then take place simultaneously on a plurality of containers at the same time, all of them then being displaced from one station to the following at the same time.

Another object of the invention is obtained by choosing a protecting sheet of non-woven textile material and such that the container and said sheet are made of heat-meltable materials so that said sheet is heat-sealed on said container.

New processes for protecting containers used in nurseries and in horticulture are obtained, and novel machines for carrying out such a process, and novel containers thus protected.

In fact, the essential principal feature of the present invention is the fact of being able to place any plant in position after the protection of the container has been effected, as indicated in the processes of the invention and not, as heretofore, before the positioning of a cover; it is thus possible according to the present invention to pass all the containers on automatic machines as described hereinbefore and hereinafter, to fix the protective sheet at a rate equivalent to that of the potting machines, viz. of the order of about 1000 to 1200 pots per hour. In fact, the containers filled with substrate may pass in such machines and beneath the sheet unwinding on these containers to be fixed thereto without risk of deteriorating the plant which is placed subsequently whilst, according to the processes known at present, it is of course, not possible to pass containers already containing said plants beneath cover-placing machines. Moreover, once the protecting sheet is positioned, it is possible to envisage a station for positioning the plant itself by an automat since, the perforation of the cover and the hollow provided in the substrate beneath the perforation being located exactly at the centre of the opening of the container, it is possible automatically and repetitively to place therein a clod of any plant after the operations described in the present invention.

The invention includes other points of interest:

The cover is perforated only at its centre and around the stem which, on growing, will occupy virtually the whole surface of said perforation, thus preventing any trickling of outside water or, on the contrary, any evaporation of the air located therebelow, whilst, in the present covers having in addition a continuous slot as far as the edge of the pot, and an unreliable or non-fixed peripheral seal, this protection against trickling and evaporation is not as efficient as in the present invention.

Moreover, it may be envisaged to carry out the planting operation proper through this perforated cover during subsequent operations offset in time and/or in space, even if it is preferable, in order to avoid collapse of the hollow made beneath said perforation, to effect said plantation shortly after the operations provided in the present specification.

In a preferred embodiment, heat-meltable sheet and container compatible with one another may be used, which enables the operation for fixing said sheet on the container to be carried out rapidly and efficiently from the standpoint of seal and compatible with the objects of the invention.

Finally, the preferred choice of a sheet made of nonwoven material so as to facilitate and allow gaseous exchanges between the volume captive beneath said protection and the ambient atmosphere may be emphasized, whilst other Patents or specifications provide the use of other types of sheet of lesser efficiency and which is not optimalized.

BRIEF DESCRIPTION OF THE DRAWINGS

The invention will be more readily understood or reading the following description with reference to the accompanying drawings, in which:

FIG. 2 is a schematic view of the machine of the invention.

FIG. 3 is a schematic representation in plan view of the different operational steps.

DETAILED DESCRIPTION OF THE DRAWINGS

Figure 4:
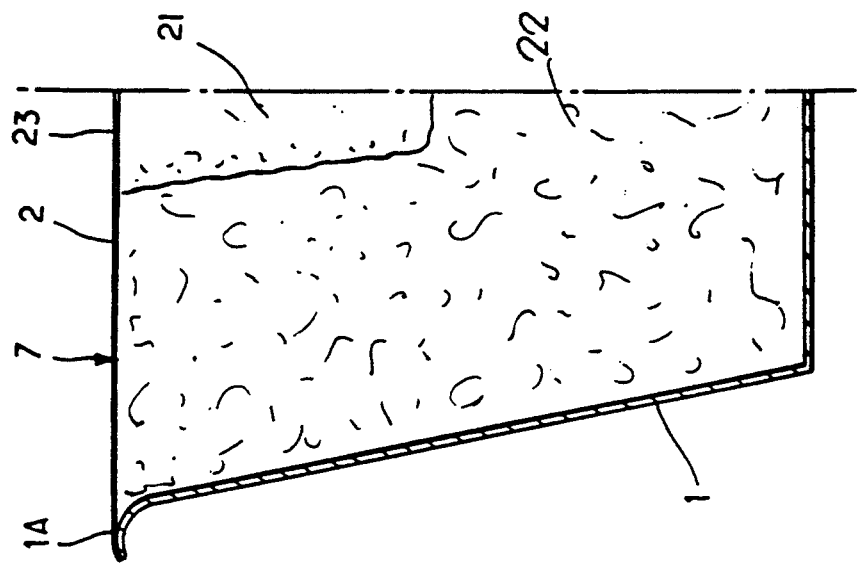
FIG. 4 is a view in partial section of a container made in accordance with the invention.
Figure 1:
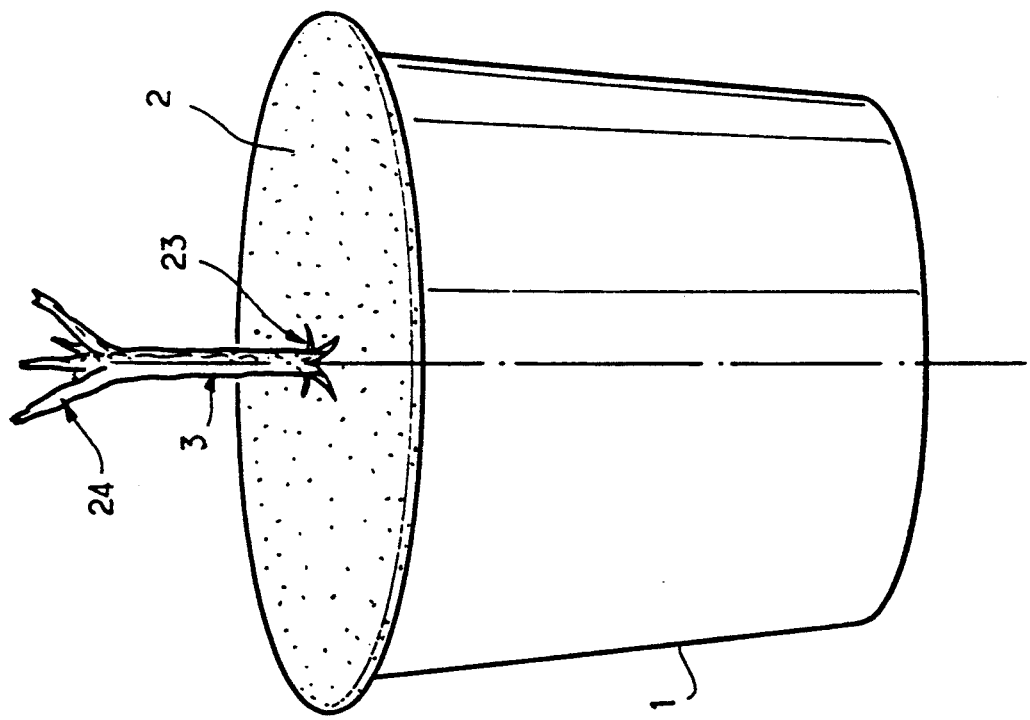
FIG. 1 is a view of a container produced by carrying out the means of the invention.

Referring now to the drawings, FIGS. 1 and 4 show the container according to the invention, constituted by a pot 1, for example in cylindro-conical form, which is filled with a substrate 22 in which is made a hollow 21 adapted to receive a plant 24 and of which the upper opening 2 is obturated by a cover 7.

In and according to the present invention, said container 1 is characterized in that said cover is a water- and air-permeable sheet 7, perforated solely at and in the vicinity of the centre of the opening 2 of the container 1, fixed on said opening 2 and the plant 24 is placed in position in the hollow 21 via said perforation 23, so that the stem 3 of said plant projects from said sheet 7 and is continuously surrounded thereby over the whole of its circumference.

In FIG. 4, the sheet 7 presents at its centre a perforation 23 which is preferably in the form of a cross, constituted for example by two intersecting slots whose lengths correspond to about the diameter of the hollow 21 made in the substrate 22; the dimensions of this perforation and of said hollow are adjusted and adapted to the dimension of the clod of earth containing the roots of the plant 24 which is provided to be subsequently planted therein; after such positioning of the plant 24 as shown in FIG. 1, the edges of the perforation 23 being opened, curved and elastically deformed during the passage of the clod, may, by the elasticity of the sheet, straighten up and embrace the circumference of the stem 23 of the plant 24, all the more so as said stem will increase in diameter as the plant grows.

The pot used for making the container according to the invention is preferably a pot 1 of cylindrical section of conical shape, but it may be of any other suitable shape.

As shown in partial view in FIG. 4, the upper edge of the pot 1 is curved outwardly in an arc 1A.

The pot used may be made of a synthetic material of the PVC type or any other heat-meltable synthetic material.

According to a preferred embodiment, the sheet 7 used is a sheet in the form of a roll of web, made of a material opaque to sunlight, and preferably black.

The sheet is air- and water-permeable, which allows the air and water necessary for the substrate to pass.

The opacity of the sheet to sunlight will prevent the development on the substrate 22 of undesirable vegetation, without it being necessary to effect weeding by hand or by chemical means, except in that part of the surface of the substrate which, due to the opening for passage of the plant, will be in the open air; as indicated hereinbefore, this opening is reduced to a minimum whilst, in the present systems, the slot which joins this opening to the edge of the pot increases the surface possibly necessary to weed.

The sheet 7 used is preferably a sheet of nonwoven, heat-meltable, synthetic fiber textile.

The advantage in using a sheet of textile material constituted by fibers is that the drops of water delivered by watering sprays or jets, are absorbed by the sheet through which the container 1 is supplied.

The sheet 7 may also be made from a woven synthetic textile material, said material being heat-meltable and said sheet being air- and water-permeable.

Similarly, the sheet used may, without departing from the scope of the invention, be a sheet of nontextile heat-meltable synthetic material, for example a sheet of nylon or PVC, but provided with microperforations rendering it air- and water-permeable.

The sheet may be fixed by heat-sealing. To that end, jointly with an application of pressure on the edges 1A of the upper opening 2 of the pot, a heating operation is effected by the means set forth in the following description of the machine according to the invention.

The melting temperature of the sheet 7 is advantageously higher than that of the edges of the pot 1, with the result that the sheet integrates in the edge of said pot, heat-sealing is effected in a very short time, of the order of two seconds in order not to detriorate the pots which must withstand the pressure exerted for the application of pressure or tension on the sheet 7.

This difference in melting and heat-sealing temperature of the sheet with respect to the pot may result from the nature of the synthetic material used and/or its small thickness with respect to the section of the upper wall of the pot.

Without departing from the scope of the invention, a container may also be produced by using a pot 1 which is not made of heat-meltable synthetic material, for example an earthenware pot or a pot made of biodegradable material such as compressed and agglomerated wood particles.

According to this embodiment, the sheet 7 is fixed by using between the sheet and the edge of the pot 1 a heat-sealing and/or heat-meltable glue; for example, the upper edge of the pot may be coated with such a glue and the air- and water-permeable sheet used may or may not be heat-meltable or heat-sealable, or coated on its face opposite the pot with a material having this property.

Fixing of the sheet 7 on the pot 1 by heat-sealing is advantageous both from the standpoint of rapid execution of the operation and from the standpoint of solidity of the fixation obtained and the guarantee of seal.

However, it is readily appreciated that any other type of fixation may be used, for example gluing on the section of the edge of the pot or on the outer periphery of said pot edge. However, all the fixations that may be envisaged must ensure a solid bond to guarantee good holding in time during growth of the plants in order to maintain the efficiency of the cover, which is not ensured at the present time by the cover systems placed after plantation and often not solidly fixed for lack of operation time.

FIG. 2 schematically shows the machine used according to the invention and FIG. 3 schematically shows in plan view the different operations carried out.

Said machine as indicated above is one for manufacturing, or rathermore for protecting the containers 1 used in nurseries and in horticulture, presenting an upper opening for filling it with earth or any other substrate effected upstream of said machine and in which a hollow is made for receiving a plant, placed in position afterwards, downwstream of said machine.

Said machine according to the present invention comprises, before any operation for positioning said plant 24, at least:

a station 8 for fixing on said opening 2 a water- and air-permeable sheet 7 which closes said opening and ensures protection of the substrate 22 by forming a cover.

a station 9 for making perforation 23 in the sheet 7 at the centre of said opening 2 with the dimensions given and adjustable as a function of the plant 24.

a system 4 for supplying and driving a plurality of containers 1 on the same line and passing beneath at least each of said stations 8, 9, beneath which the containers are successively stopped for a sufficient period of time, thanks to any known timing means to allow each of the corresponding operations.

a means 20 for delivering said containers 1 thus protected and which may subsequently receive at any moment a plant 24 in the hollow 21 then located beneath said sheet 7 and through said perforation 23.

Said container supply and drive system may be essentially constituted by an endless chain 4 with catches 5 between which the pots 1 are held.

The distance between catches 5 may be adjustable as a function of the dimensions of the pots. For example, for pots or containers 1 of the order of 3 to 4 liters, which are those often used in the domain in question, such adjustment may be given by a contactless proximity detector and allow step by step advance of the chain 4 of the order of about 24 centimetres.

Said chain 4 is actuated by a motor 6 controlled by a timing means, with the result that each of the pots 1 taken over is stopped for a determined time beneath each of the operational stations as described hereinafter. When a pot 1 arrives at the inlet of the chain 4 with catches 5, it is detected by a contact: the chain immediately advances by one step driving the pot towards the first operational station. After a period of time corresponding to the duration of the operation at this first station, the second pot is allowed to enter the chain which, in a fresh step, drives the first pot beneath the following station, and so on, beneath all the possible operational stations until the first pot, having penetrated on said chain, arrives at the outlet of said machine on any drive means 20, such as a double conveyor belt with distribution by switching of any known type. This evacuation belt 20 may be driven by a drive motor 19 and serve as plane for positioning said plants 24 in the perforations in the sheets 7 fixed to said pots or containers 1 and made in the operational stations analyzed hereinabove.

On the frame of said machine according to the invention, there is mounted a roll 25 of a web of sheet 7 unwound by any means above said containers 1 and the drive means 4 in the same line and direction of drive: the machine comprises, after the perforation station 9, a station 10 for cutting out said sheet 7 to disconnect the parts then fixed on the containers from the supply web 25.

The machine according to the invention may thus comprise, successively in the direction of advance of the chain 4:

at least one station 8 for fixing the web of sheet on the upper opening of the pots 1, at least one station 9 for perforating the sheet at its centre, at least one station 10 for cutting the web of sheet, at least one station 11 for trimming the excess sheet 7 around the pot 1 by cutting, which may be effected and adjusted exactly to the shape and exact outer contour of the upper opening of the pot 1.

Station 8 for fixing the sheet 7 is constituted by a vertical, upwardly-downwardly moving jack 12, of any known type.

At the lower end of the jack 12, towards the pot, there is fixed a heating plate 13.

The heating plate is maintained at the desired temperature by electric resistors or heating elements of any known type.

The heating plate has a contour adapted to the upper section of the pot 1 and, in the type of pot shown, this contour is circular, its diameter being larger than that of the opening of the pot.

When jack 12 is lowered, the heating plate 12 presses the sheet 7 and, by heat-sealing, fixes it on the opening of the pot; this is, of course, possible only if a container 1 and sheet 7 have been chosen in heat-meltable materials, therefore compatible with each other to be glued or melted together and preferably where the melting point of the sheet 7 is higher than that of the container 1, so that said sheet integrates in the edge thereof by pressure jointly with heating, in a very short time, for example two seconds, so that heat-sealing of the assembly is effected without deforming the outer edge of the pot.

In the embodiment of the invention shown in FIG. 4, the sheet 7 is heat-sealed on the arcuate top 1A of the pot 1.

Station 9 for perforating the web of sheet may be constituted by a vertical, upwardly-downwardly moving jack 14, which bears a cutter 15 at its end.

When the pot, on which the web of sheet has been previously fixed, stops beneath station 9, the cutter 15 perforates the sheet stretched on the pot 1 when jack 14 is lowered.

Cutter 15 is preferably constituted by two triangular blades at right angles, which cut out, at the centre of the sheet obturating the pot, a cross allowing subsequent passage of the plant 24.

Following station 10 is constituted by a heating wire 16 transverse to web 7 which is mounted on a frame borne by a vertical, upwardly-downwardly moving jack.

The heating wire is lowered after passage of each of the pots so as to disconnect the pot, having undergone the operations of stations 8 and 9, from the web 7.

Actuation of station 10 is synchronized by timing with the operation of station 8 so that the web 7 is always under tension.

Trimming station 11, whose function is to cut the excess sheet 7 around the pot, may be constituted by a mill 17 actuated in any known manner, for example pneumatically, borne by a rotating plate 18 at the end of a vertical up-down jack.

Plate 18 may be inclined at the end of its supporting jack so that mill 17 comes tangentially to the arcuate edge of the pot and so that trimming is effected on the outer side of said edge.

When the jack and plate 18 are lowered, the mill comes into contact with the excess sheet and cuts it out around the pot.

Between perforating station 9 and trimming station 11 there may be interposed on the machine a up-down jack provided at the end of its shank with a cone or any other shape which passes through the cruciform opening in the sheet and at that moment makes the hollow 21 in the substrate 22, as shown in FIG. 4.

This embodiment of the invention is not shown in order to simplify FIG. 2, but it may also be envisaged that cutter 15 of the perforating station 9 comprises on the cutter support a form which makes said hollow 21: the blades constituting said cutter 15 then project beyond this form to allow passage through the sheet 7 and penetration thereof in the substrate. This cut-out and hollowing operation in the machine according to the invention avoids making this operation previously and therefore also reduces the overall time of the potting, protecting and planting operations of said containers 1.

The machine according to the invention is in fact particularly adapted to be disposed downstream of a potting machine which operates at a predetermined rate regulated with that of the machine according to the invention for dispensing a dose of substrate in each pot 1.

Downstream of the machine according to the invention, the containers will receive a plant introduced through the opening in the upper sheet 7 with which they are provided, so as to obtain a container 1 ready for growth of the plant thus introduced therein as shown in FIG. 1. These containers are then marketed when the plant has attained a satisfactory size and sold without any other operation, directly to the customer.

This machine according to the invention, constituted by a chain with catches and at least three or four automatic work stations as described hereinabove, may be managed by a programmer and thus ensure an output of 1000 to 1200 pots per hour; a higher rate may be envisaged, although this is not indispensable as such rates are compatible with those of the other potting machines used in the profession at the present time.

The above rate may be produced thanks to the process and/or the machine according to the invention described hereinabove, which comprises in particular an operation of heat-sealing of non-woven sheet on said nursery and horticultural containers, characterized by the principle of continuous production with four different stations such as sealing of the sheet, cutting a cross therein, separating said sheet from the supply web by cutting and trimming said sheet, four or five pots located on said work line being subjected simultaneously to these four operations.

What is claimed is:

1. A process for providing a protected container for use in nurseries and adapted for receiving a plant of a predetermined size, comprising the steps of:

providing a container having an upper opening; filling said container with a substrate;

forming a hollow in said substrate, said hollow being arranged to receive a plant;

selecting a perforated sheet which is air and water permeable;

firmly fixing on said opening said water- and air-permeable sheet to close said opening; and perforating said sheet at a center of said opening said perforation being dimensioned to accommodate the predetermined size of said plant.

2. The container protecting process of claim 1, comprising the steps of:

dispensing said sheet from a roll of web; and cutting the web into individual sheets before said sheets are fixed to said container.

3. The process of claim 1, comprising the step of heat-sealing said sheet to said container.

4. The process of claim 1, comprising the step of gluing said sheet to said container.

5. The process of claim 1, comprising the step of positioning the plant in the hollow so that the stem of said plant projects through the perforation in the air- and water-permeable sheet and said stem is continuously surrounded by said sheet.

* * * * *